Patented May 6, 1941

2,240,584

UNITED STATES PATENT OFFICE 2,240,584

PROCESS FOR THE PRODUCTION OF MAGNESIUM

Robert Suchy and Hellmuth Seliger, Bitterfeld, Germany, assignors, by mesne assignments, to Magnesium Development Corporation, a corporation of Delaware No Drawing. Application January 4, 1939, Serial No. 249,276. In Germany January 24, 1938

9 Claims. (Cl. 75—67)

This invention relates to a process for the production of magnesium.

It is known to reduce oxidic magnesium compounds, such as calcined magnesite or dolomite, at a high temperature in vacuo by means of calcium carbide in externally heated stationary retorts or the like, thereby producing magnesium vapour and a more or less pulverulent residue of lime and carbon, according to the reaction equation: $MgO+CaC_2=Mg+CaO+2C$.

This process has the disadvantage that a certain quantity of the pulverulent reaction residue is entrained into the condenser for the magnesium vapours.

This disadvantage is substantially more marked if the known process be modified by carrying it out in rotary or shaft furnaces wherein the reaction mixture is agitated. The presence of such entrained pulverulent reaction residue in the condensed magnesium has an adverse effect when the condensed metal is subsequently melted in order to convert it into a compact form since it hinders the coalescence of the metal.

The present invention aims at obviating the foregoing disadvantages.

To this end, according to the invention, the reaction residues are caused to agglomerate or sinter together in the course of the reaction by ensuring the presence, in the reaction mixture, of a substance or mixture of substances which are adapted to produce such agglomeration.

In carrying out the invention, silica and/or alumina are preferably added to the reaction mixture for this purpose, the silica being preferably used in the form of powdered quartz. The silica and alumina may be used conjointly in the form of calcined clay, in which alumina and silica are present approximately in the proportion of 1:2. At the reaction temperatures the lime reacts with the silica to form calcium silicate or with the alumina to form calcium aluminate, the melting points of which products lie substantially below that of the lime, so that at the temperatures of 1200 to 1400° C. required for the reaction, sintered residues are produced.

The amounts of added silica or alumina are preferably such that dibasic calcium silicate or mono-basic calcium aluminate is formed in accordance with the equations:

1. $2MgO+2CaC_2+SiO_2=2CaO.SiO_2+4C+2Mg$

2. $MgO+CaC_2+Al_2O_3=CaO.Al_2O_3+2C+Mg$

The silica or alumina may also be admixed with the reaction material in smaller proportions than correspond to the above equations; however, the amounts added are preferably at least so high as to ensure the formation of the still relatively low melting tribasic compounds ($3CaO.SiO_2$ and $3CaO.Al_2O_3$). Additions of silica or alumina exceeding the amounts to be calculated from the foregoing equations, however, have a disadvantageous effect insofar as this enables double silicates or aluminates of magnesium and calcium to be formed, thereby reducing the yields of magnesium.

Instead of employing a reaction mixture consisting of magnesium oxide and calcium carbide and separately adding silica, it is also possible to cause a mixture of magnesium silicate and calcium carbide to react directly, whereby the magnesia of the magnesium silicate is reduced by the calcium carbide and the resulting lime reacts with the residue of silica to form calcium silicate which is also obtained in a sintered or agglomerated form. Both synthetically produced magnesium silicate and naturally occurring silicate (such as dehydrated serpentine) may, for example, be used for this purpose.

In this latter embodiment of the invention it is necessary to ensure, that at least sufficient lime is present in the reaction mixture or is produced during the reaction to cause all the silica present to be converted into dibasic calcium silicate, if necessary, by separately adding the requisite quantity of lime. However, an excess of lime should be avoided, since the presence of unconverted lime in the reaction mixture will slow up the reaction.

For example, if it be intended to form a dibasic calcium silicate, when using serpentine the composition of which in the calcined (anhydrous) state corresponds to the formula: $3MgO.2SiO_2$ the reaction mixture should consist of 1 molecule of anhydrous serpentine, 3 molecules of calcium carbide and 1 molecule of quicklime, in accordance with the equation:

$$3MgO.2SiO_2+3CaC_2+CaO= 2(2CaO.SiO_2)+3Mg+6C$$

Reaction promoters such as chlorides or fluorides of the alkaline earth and alkali metals or cryolite may be added to the reaction mixtures of the present invention, in a quantity not exceeding about 5% of the total.

We claim:

1. A process for the production of magnesium metal from oxidic magnesium compounds by thermal reduction with the aid of calcium carbide, which comprises incorporating silica with the reaction mixture in a quantity adapted to react, under the conditions of reaction, with the lime formed by decomposition of the calcium carbide, so as to cause the formation of a calcium silicate in which the molar ratio of CaO to $SiO_2$ approximately lies between 2 and 3 to 1, the limits of the range being included.

2. A process for the production of magnesium metal from oxidic magnesium compounds by thermal reduction with the aid of calcium carbide, which comprises incorporating alumina with the reaction mixture in a quantity adapted to react, under the conditions of reaction, with the lime formed by decomposition of the calcium carbide so as to cause the formation of a calcium aluminate in which the molar ratio of CaO to $Al_2O_3$ approximately lies between 1 and 3 to 1, the limits of the range being included.

3. A process for the production of magnesium metal from oxidic magnesium compounds by thermal reduction with the aid of calcium carbide, which comprises incorporating calcined clay with the reaction mixture in a quantity adapted to react, under the conditions of reaction, with the lime formed by decomposition of the calcium carbide, so as to cause an agglomeration of the reaction residue.

4. A process for the production of magnesium metal from oxidic magnesium compounds by thermal reduction with the aid of calcium carbide, which comprises causing calcium carbide to react upon magnesium silicate.

5. A process for the production of magnesium from magnesium silicate by thermal reduction with calcium carbide which comprises incorporating in the reaction mixture a quantity of lime sufficient to combine with the residual silica to yield a residue approximately conforming, in composition, to dibasic calcium silicate.

6. A process for the production of magnesium metal from oxidic magnesium compounds by thermal reduction with the aid of calcium carbide, which comprises causing calcium carbide to react upon magnesium silicate, at least one substance of the group consisting of the chlorides and the fluorides of the alkaline earth metals and the alkali metals and cryolite, in a quantity adapted to cause promotion of the reaction being incorporated in the reaction mixture with the reaction ingredients.

7. The process of producing magnesium metal by thermal reduction which comprises forming a reaction mixture containing oxidic magnesium compound, calcium carbide, and at least one lime-reacting substance of the group consisting of silica and alumina, said lime-reacting substance being present in amount sufficient to react with the lime produced by decomposition of the calcium carbide upon heating of the reaction mixture to cause agglomeration of the reaction residue.

8. In the process of producing magnesium metal from oxidic magnesium compounds by thermal reduction, the steps comprising forming a reaction mixture of said magnesium compound and calcium carbide in the presence of a substance containing at least one of the group of lime-reacting compounds consisting of silica and alumina, the silica and alumina being present in said substance in amount sufficient to react with the lime produced by decomposition of calcium carbide upon heating of the reaction mixture to form an agglomerated residue containing a compound of the group consisting of calcium silicate and calcium aluminate, and heating the reaction mixture.

9. The process of producing magnesium metal by thermal reduction comprising forming a reaction mixture containing oxidic magnesium compound, calcium carbide, a substance containing at least one of the group of lime-reacting compounds consisting of silica and alumina, the silica and alumina being present in said substance in amount sufficient to react with the lime produced by decomposition of calcium carbide upon heating of the reaction mixture to form an agglomerated residue containing a compound of the group consisting of calcium silicate and calcium aluminate, and at least one substance consisting of the group of chlorides and fluorides of the alkaline earth and alkali metals, and heating the reaction mixture.

ROBERT SUCHY.
HELLMUTH SELIGER.